UNITED STATES PATENT OFFICE.

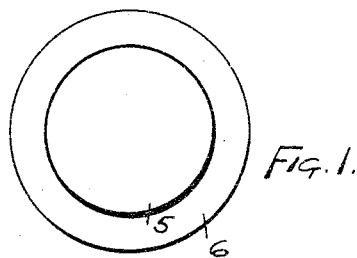
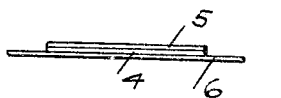
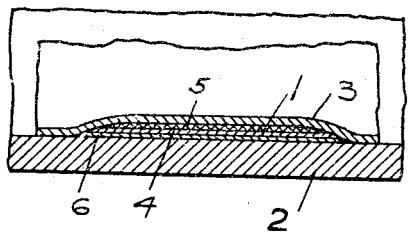
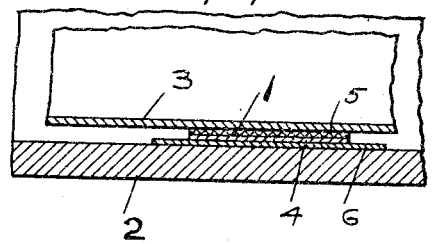
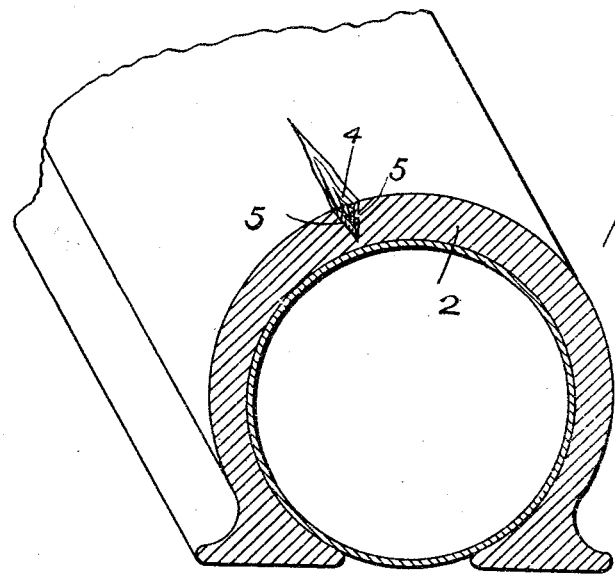

JOSEPH G. MOOMY, OF ERIE, PENNSYLVANIA.

TIRE-PATCH.

1,182,698.  Specification of Letters Patent.  Patented May 9, 1916.

Application filed October 7, 1915. Serial No. 54,517.

*To all whom it may concern:*

Be it known that I, JOSEPH G. MOOMY, a citizen of the United States, residing at Erie, in the county of Erie and State of Pennsylvania, have invented new and useful Improvements in Tire-Patches, of which the following is a specification.

This invention relates to tire patches and consists in certain improvements in the construction thereof as will be hereinafter fully described and pointed out in the claims.

The object of the invention is to form a patch of more general application than those now generally in use.

The invention is illustrated in the accompanying drawings as follows:—

Figure 1 shows a plan view of the patch. Fig. 2 a side elevation of the patch. Fig. 3 a section of a fragment of a tire under pressure, said tire having a patch in place therein. Fig. 4 a similar view with the tire before pressure is applied. Fig. 5 a sectional perspective of a tire showing the method of patching a surface cut.

1 marks the patch, 2 the tire shoe, and 3 the inner tube. The tire patch is made up of a layer 4 forming one surface of the patch which is formed of a substance hardening on exposure to the air. A compound that may be us 1 for this layer may be as follows: gutta percha and rubber preferably in proportions of forty parts of gutta percha and sixty of rubber to which is added a suitable filler such as mica, zinc, whiting or litharge, the proportion of filler being about fifteen parts to one hundred parts of gutta percha and rubber as above indicated. A preferable filler would consist of equal portions of mica, zinc and whiting.

The layer forming the opposite surface of the patch is formed of a material which will remain tacky on exposure to air and this is preferably accomplished by forming this layer of raw rubber or nonvulcanizing stock.

A seal 6 is provided for the layer 4. This is preferably formed of glazed muslin and excludes the air sufficiently from the layer to prevent its hardening prior to its application.

In using the patch for repairing a tube, the surface 5 is applied to the tube and by reason of its tacky quality readily adheres to the tube. The seal 6 may be left on the opposite surface or if this surface is exposed for any length of time to the air it will become sufficiently dry and hardened to prevent its sticking to the shoe so that the patch is a desirable one for repairing tubes.

The patch is peculiarly fitted for surface repairing on the shoe as indicated in Fig. 5. Here a portion of the patch is taken and forced into the cut with the surface 5 next to the surface of the cut. This assures a ready adhesion with the surface of the cut and forms a backing of the material of the layer 4 which backing being initially soft unites, as it is doubled up in the cut forming a united mass and this after a short exposure to the air becomes dry and hardened and thus gives the necessary toughness to the surface. Thus the patch may be used to advantage both in patching the inner tube and for surface repairing. It thus saves the duplication of material for these various purposes.

What I claim as new is:—

1. A tire patch comprising a layer at one surface initially soft but hardening on exposure to air and a layer at the opposite surface initially soft and remaining tacky in the presence of air.

2. A tire patch comprising a layer at one surface comprising rubber and gutta percha initially soft, but hardening on exposure to air and a layer at the opposite surface initially soft and remaining tacky in the presence of air.

3. A tire patch comprising a layer at one surface initially soft and hardening on exposure to air and a layer at the opposite surface formed of nonvulcanizing rubber stock.

4. A tire patch comprising a layer at one surface formed of gutta percha and rubber and a filler initially soft, but hardening on exposure to air and a layer at the opposite surface formed of raw rubber.

5. A tire patch comprising a layer at one surface initially soft and hardening on exposure to air; a seal for said surface; and a layer at the opposite surface initially soft and remaining tacky in the presence of air.

In testimony whereof I have hereunto set my hand.

JOSEPH G. MOOMY.